Aug. 25, 1964 — P. L. ZINK — 3,145,522
CENTER DELIVERY WHEEL RAKE
Filed April 30, 1962 — 4 Sheets-Sheet 2

INVENTOR.
PHILLIP L. ZINK
BY
Merchant, Merchant & Gould
ATTORNEYS

Aug. 25, 1964 P. L. ZINK 3,145,522
CENTER DELIVERY WHEEL RAKE
Filed April 30, 1962 4 Sheets-Sheet 3
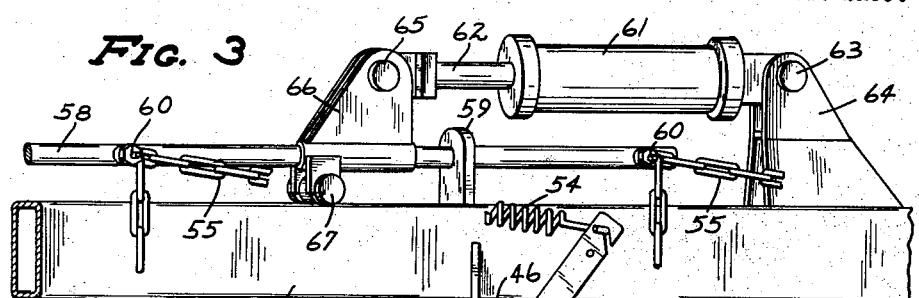
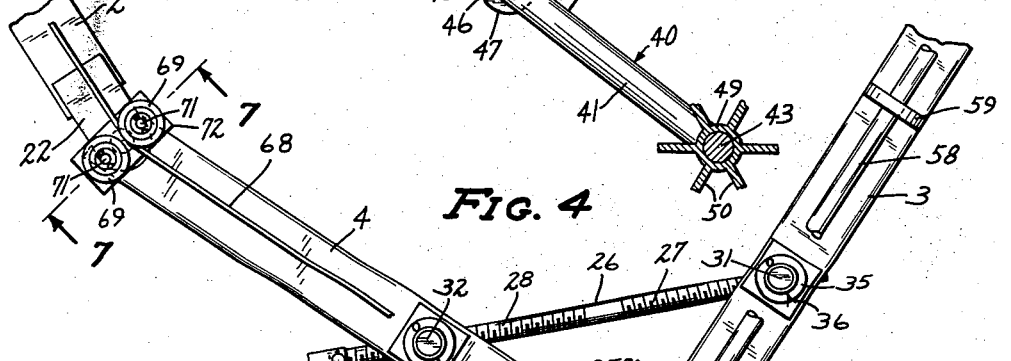
INVENTOR.
PHILLIP L. ZINK
BY
ATTORNEYS

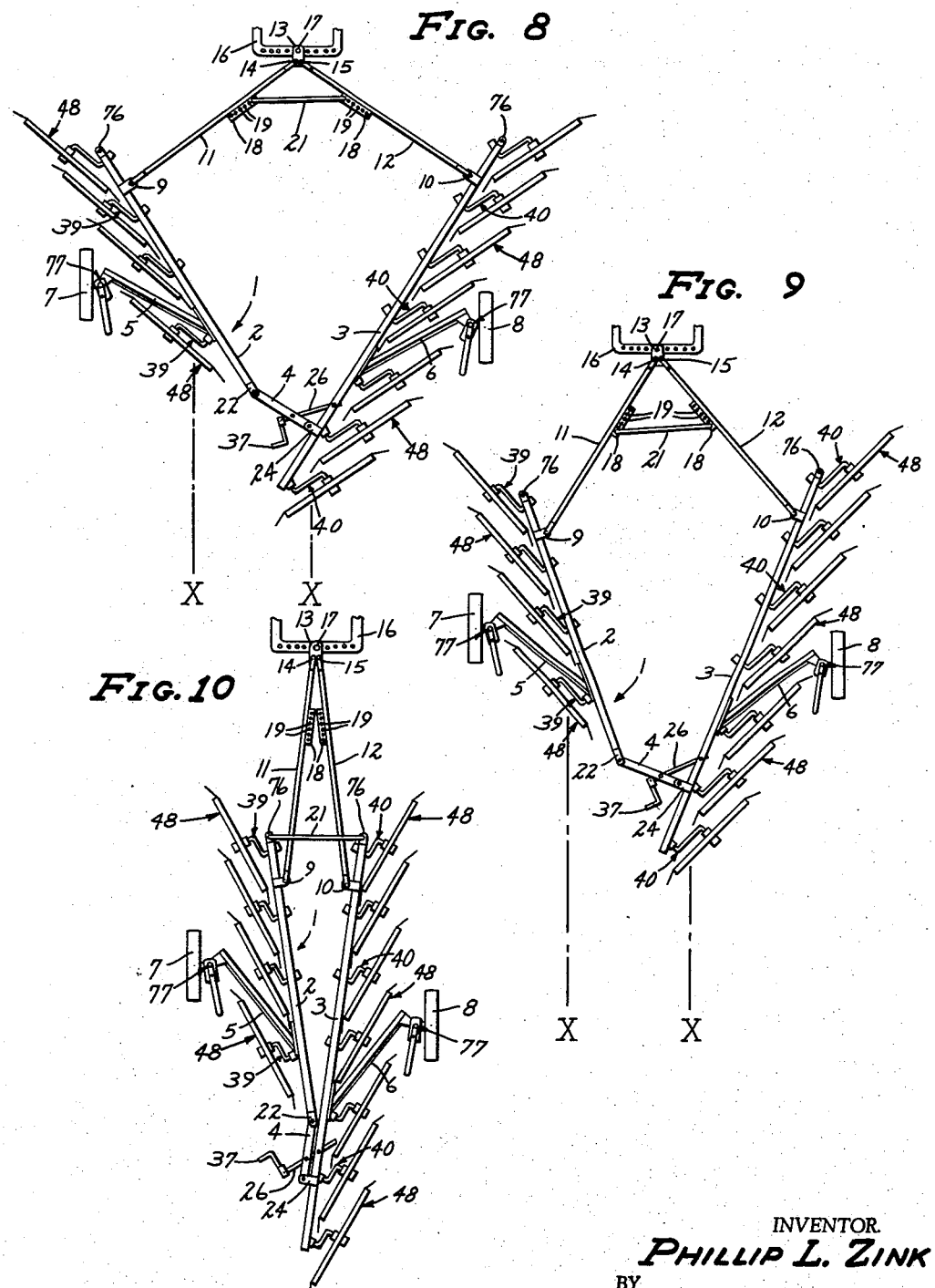

United States Patent Office 3,145,522
Patented Aug. 25, 1964

3,145,522
CENTER DELIVERY WHEEL RAKE
Phillip L. Zink, Marshalltown, Iowa, assignor to Daffin Corporation, Hopkins, Minn., a corporation of Delaware
Filed Apr. 30, 1962, Ser. No. 191,005
4 Claims. (Cl. 56—377)

My invention relates generally to agricultural implements, and more particularly to improvements in rotary wheel rakes of the type involving a plurality of freely rotating raking wheels disposed in echelon relative to the direction of travel of the rake.

Rotary wheel rakes have been heretofore produced utilizing a pair of echelon arrangements angularly displaced relative to each other to provide a rake in the form of a wedge, for delivery of hay or the like to opposite sides of a line of travel, the apex of the wedge comprising the leading end portion of the rake. It has been found that, by combining a pair of rakes in such wedge arrangement, a much wider swath may be raked than formerly, without enlarging the angular displacement of the echelons from the line of travel beyond a point where the efficiency of the raking operation is impaired.

My present invention also contemplates the use of a pair of echelon arrangements in a type of wedge formation. In the present structure, I dispose the apex portion at the rear end of the rake, so that the hay is gathered by rearwardly converging echelons into a single central windrow.

More specifically, one of the echelons extends angularly rearwardly of the other of said echelons, whereby said echelons cooperate to define a generally Y-shaped formation.

An important object of my invention is the provision of a center delivery rotary wheel rake comprising a pair of groups of freely rotatable raking wheels, each group of which is arranged in echelon and the echelons converging rearwardly relative to the direction of movement of the rake over the ground, and of novel means for changing the angular relationship between the echelons and for releasably locking the echelons in different positions of angular displacement.

Another important object of my invention is the provision of a center delivery rotary wheel rake, as set forth, having novel means for varying the lateral spacing between the converging rear ends of the echelons of raking wheels, whereby to vary the width of the windrow raked thereby.

Another object of my invention is the provision of a rake, as set forth, comprising a pair of rearwardly converging rake wheel supporting frame members, supporting wheels for said frame members, and novel means for mounting the supporting wheels to their respective frame members, whereby the supporting wheels may be quickly and easily disposed in different angular positions relative to their respective frame members, and locked in said positions to guide said frame members in a forward direction of movement irrespective of the angular displacement of said frame members from said direction of movement.

Still another object of my invention is the provision of a rake, as set forth, in which the frame members and their respective echelons of rotary raking wheels may be quickly and easily moved relative to each other to ready the rake for raking a wide swath, or for transport on a relatively narrow road or highway.

The above, and still further highly important objects and advantages of my invention will become apparent from the following detailed specification, appended claims and attached drawings.

Referring to the drawings, which illustrate the invention, and in which like reference characters indicate like parts throughout the several views:

FIG. 3 is an enlarged fragmentary view, partly in section and partly in side elevation, as seen from the line 3—3 of FIG. 1;

FIG. 4 is an enlarged fragmentary detail corresponding to a portion of FIG. 1, but showing a different position of some of the parts, some parts being broken away and some parts being shown in section;

FIG. 5 is an enlarged fragmentary view in top plan corresponding to a portion of FIG. 1 and showing one of the wheel mounting means, some parts being broken away and some parts being shown in section;

FIG. 7 is an enlarged fragmentary section taken on the line 7—7 of FIG. 4; and

FIGS. 8, 9 and 10 are diagrammatic views corresponding to FIG. 1, but showing different adjusted positions of various parts.

Figure 1:
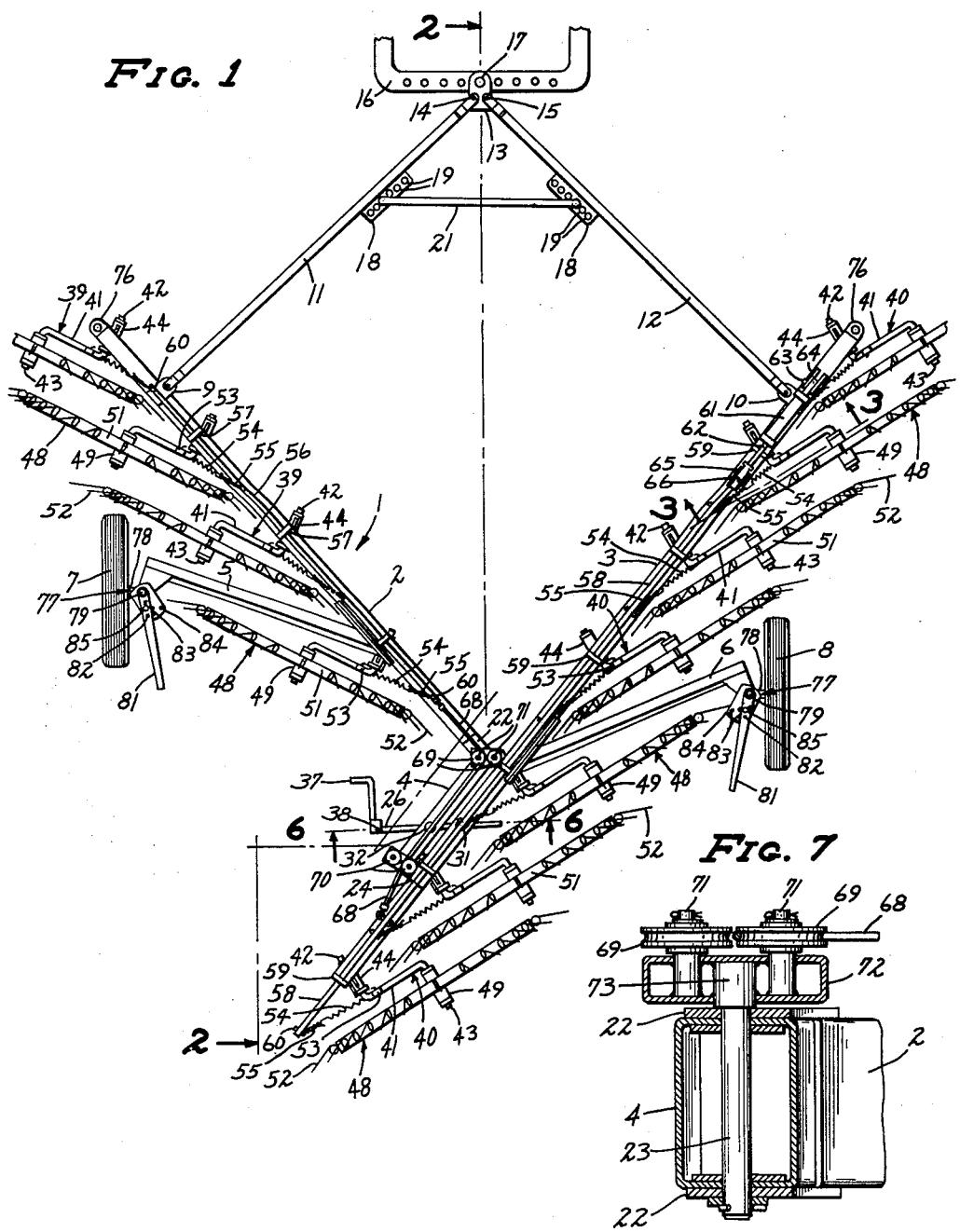
FIG. 1 is a view in top plan of a rotary wheel rake produced in accordance with my invention.

In the preferred embodiment of my invention illustrated, a generally Y-shaped frame, indicated in its entirety by the numeral 1, is shown as comprising a pair of generally horizontally disposed elongated frame members 2 and 3 and a rigid connecting link 4. The frame members 2 and 3 are each supported by angularly outwardly extending legs 5 and 6 respectively, having respective ground engaging wheels 7 and 8 connected to the outer ends thereof by means hereinafter to be described. Adjacent their front end portions, the frame members 2 and 3 are provided with mounting brackets 9 and 10 respectively to which are pivotally connected the rear ends of respective draft arms 11 and 12 which converge forwardly, the front ends thereof being pivotally connected to a coupling element comprising a pair of generally horizontally disposed vertically spaced hitch plates or the like 13, as indicated at 14 and 15 respectively. As shown particularly in FIGS. 1 and 2, the hitch plates 13 are adapted to be pivotally connected to the draw bar 16 of a conventional prime mover such as a tractor or the like, not shown, by means of the usual hitch pin, indicated at 17. It will be noted that the pivotal connections of the draft arms or tongues 11 and 12 to their respective frame members 2 and 3 and to the hitch plates 13, and of the hitch plates 13 to the draw bar 16, are all on vertical axes. The draft arms or tongues 11 and 12 are provided with longitudinally extending flanges or brackets 18 each having a row of longitudinally spaced apertures 19 therein for selective reception of the down-turned ends 20 of a rigid tie rod or the like 21, see particularly FIGS. 1 and 2, one of the down-turned ends 20 being shown in FIG. 2. Preferably, the frame members 2 and 3, the link 4 and the draft arms or tongues 11 and 12 are made from flat sheet steel stock fabricated into cross sectionally rectangular tubes, as are the legs 5 and 6, to obtain maximum strength and rigidity with a minimum of weight.

As shown particularly in FIGS. 1 and 8–10, the frame members 2 and 3 converge rearwardly, the frame member 3 being of greater length than the frame member 2 and extending angularly rearwardly of the rear end of the frame member 2. The rear end of the frame member 2 is provided with a pair of rearwardly extending bars or tongues 22 which span the adjacent end of the link 4, and a vertically disposed pivot pin 23 extends through suitable aligned openings in the tongues 22 and said adjacent end of the link 4 to provide the pivotal connection between the rear end of the frame member 2 and link 4. The frame member 3 is provided with a pair of tongues or plates 24, similar to the tongues 22, the tongues or plates 24 projecting transversely from the frame member 3 in forwardly spaced relation to the rear end of the frame member 3, the adjacent end of the link 4 being disposed between the tongues 24 and pivotally connected thereto by a vertically disposed pivot pin 25, see FIGS. 2 and 4.

Figure 6:
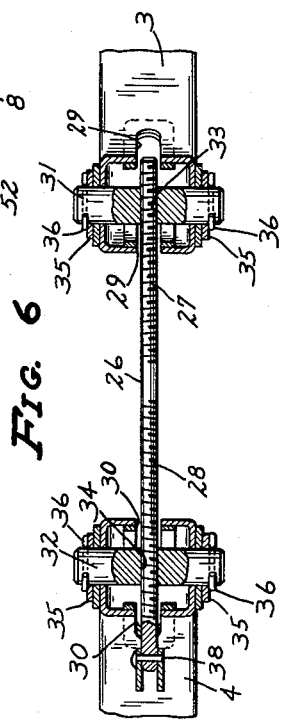
FIG. 6 is an enlarged fragmentary section taken on the line 6—6 of FIG. 1 but showing a different position of some of the parts.

For the purpose of imparting swinging movements to the link 4 relative to the frame member 3 about the axis of the pivot pin 25, I provide an elongated adjustment screw 26 having right and left-hand screw threads 27 and 28 thereon. The adjustment screw 26 extends through elongated slots 29 and 30 in the frame member 3 and link 4 respectively, and transversely through a pair of vertically extending nut-acting shafts 31 and 32 that are journalled in suitable apertures in the frame member 3 and link 4 respectively, see FIG. 6. The shafts 31 and 32 have screw threaded apertures 33 and 34 which threadedly receive the portions 27 and 28 of the screw 26, and are equipped with washers 35 and cotter pins 36 to limit axial movements of the shafts 31 and 32 in the frame member 3 and link 4. Laterally outwardly of the link 4, the adjustment screw 26 is provided with an operating crank or the like 37 by means of which rotary movement may be imparted to the adjustment screw 26, the crank 37 being secured to the adjacent end of the screw 26 by a transverse pivot pin or the like 38, see particularly FIGS. 4 and 6.

Operatively associated with the frame member 2 is a plurality of rake wheel mounting cranks 39, another plurality of rake wheel mounting cranks 40 being operatively associated with the frame member 3, the cranks 39 and 40 differing only in that they are of opposite hand. Each of the cranks 39 and 40 includes a crank arm portion 41, a mounting shaft portion or pintle at one end of the crank portion 41 and normal thereto, and a wheel axle 43 parallel to the pintle 42 and extending from the opposite end of the crank portion 41 in a direction opposite that of the pintles 42. The pintles 42 of the cranks 39 and 40 are journalled in bearings 44 carried by the frame members 2 and 3, the cranks 39 swinging on parallel horizontal axes oblique to the longitudinal dimensions of the frame member 2, the cranks 40 swinging on parallel horizontal axes oblique to the longitudinal dimension of their respective frame member 3. The several cranks 39 and 40 are supported by their respective bearings 44 for generally upward and downward movements of their wheel axles 43, each of the bearings 44 being provided with rigid stop fingers 45 that are adapted to engage circumferentially spaced stop shoulders 46 formed in flanges or collars 47, welded or otherwise rigidly mounted on the pintles 42 of the cranks 39 and 40, see particularly FIGS. 3 and 4. In the preferred embodiment of the invention illustrated, the cranks 39 are four in number, the cranks 40 associated with the longer frame member 3 being seven in number.

Journalled on the axles 43 of the cranks 39 and 40 are rotary raking wheels 48 each comprising a central hub 49, radial spokes 50, circular rims 51, and circumferentially spaced generally radially outwardly extending resilient raking tines 52, the cranks 39 and 40 are so disposed relative to their respective frame members 2 and 3, that the raking wheels 48 carried thereby are arranged in echelons, the planes of the raking wheels 48 in each echelon thereof being substantially vertical and angularly displaced with respect to the direction of forward movement of the frame 1 over a field. As shown in FIGS. 1 and 8–10, the wheels 48 of each echelon thereof are disposed in over-lapping relationship, rotary raking movement being imparted to the raking wheels 48 by engagement of the tines 52 thereof by the cut crop on the ground and in a direction to move the crop, such as hay or the like, laterally inwardly toward the central portion of the rake.

The crank arm portions 41 of each of the cranks 39 and 40 are provided with lifting bars or the like 53 that extend normal to the crank arm portions 41 in a generally upward direction. Coil tension springs 54 are connected at one of their ends each to the upper end portion of a different one of the lifting bars 53, and at their other ends each to one end of a different one of a plurality of link chains 55. The chains 55 associated with the cranks 39 are each releasably anchored to an elongated lifting rod 56 that is disposed in overlying spaced parallel relation to the frame member 2 and which is supported therefrom by longitudinally spaced brackets 57 for longitudinal sliding movements relative to the frame member 2. Likewise, the chains 55 associated with the cranks 40 are releasably connected to longitudinally spaced points of an elongated lifting rod 58 that is disposed in overlying spaced parallel relation to the frame member 3 and mounted for longitudinal sliding movement relative thereto by spaced brackets 59 extending upwardly from the frame member 3. As shown best in FIGS. 3 and 4, the chains 55 are releasably anchored to their respective lifting rods 56 and 58 by nut equipped bolts or the like 60 extending through the lifting rods 56 and 58 and through selected links of the chains 55, whereby tension on the springs 54 may be varied.

Means for imparting longitudinal movements to the lifting rods 56 and 58 in directions to increase or decrease the lifting bias of the springs 54 includes a fluid pressure operated cylinder 61, a cooperating piston plunger 62, and connections now to be described. The cylinder 61 is pivotally mounted, as indicated at 63, in a bifurcated mounting bracket 64 on the front end portion of the frame member 3, see particularly FIGS. 3 and 4. The free end of the plunger rod 62 is pivotally connected, as indicated at 65, to a second bracket 66 rigidly secured to the lifting rod 58, the brackets 66 being provided with a roller or the like 67 which rolls over the top surface of the frame member 3. The cylinder 61 is adapted to be operatively coupled to a source of fluid pressure, not shown, by the usual conduit means, also not shown, but in the conventional manner, introduction of fluid under pressure to the end of the cylinder 61 adjacent the mounting bracket 64 causing outward movement to be imparted to the plunger rod 62 to move the lifting rod 58 in a direction to cause the bias of the springs 54 to be increased to swing the cranks 40 in an upward direction, whereby to raise the raking wheels 48 associated with the frame member 3 out of engagement of the tines 52 thereof with the ground and with cut crops on the group. The rear end portion of the lifting rod 58 is connected to the rear end of the lifting rod 56 by a flexible cable 68 that is entrained between pairs of guide rollers or sheaves 69 and 70, the sheaves 69 being journalled on laterally spaced vertical stub shafts 71 that are mounted in a support member 72 that is welded or otherwise secured to an enlarged head 73 of the pivot pin 23, see particularly FIG. 7. In like manner, the sheaves 70 are journalled on stub shafts 74 that extend upwardly from a support member 75 carried by the pivot pin 25. With the above arrangement, fluid pressure imparted movement of the lifting rod 58 in a direction to raise the raking wheels 48 associated with the frame member 3 will be transferred to the lifting rod 56 to raise the raking wheels 48 associated with the frame member 2. Thus, all of the raking wheels 48 are raised simultaneously; and movement of the lifting rod 58 in the opposite direction will permit the weight of the raking wheels 48 associated with the frame member 2 to impart movement to the lifting arm 56 in a direction to maintain the cable 68 in a taut condition. When the lifting rods 56 and 58 are moved in directions to cause the raking wheels 48 to be lowered, sufficient tension is maintained in the springs 54 to support most of the weight of their respective raking wheels, whereby the raking wheels are floatingly suspended and easily moved upwardly and downwardly so that the same may follow irregularities in round contour.

Figure 2:
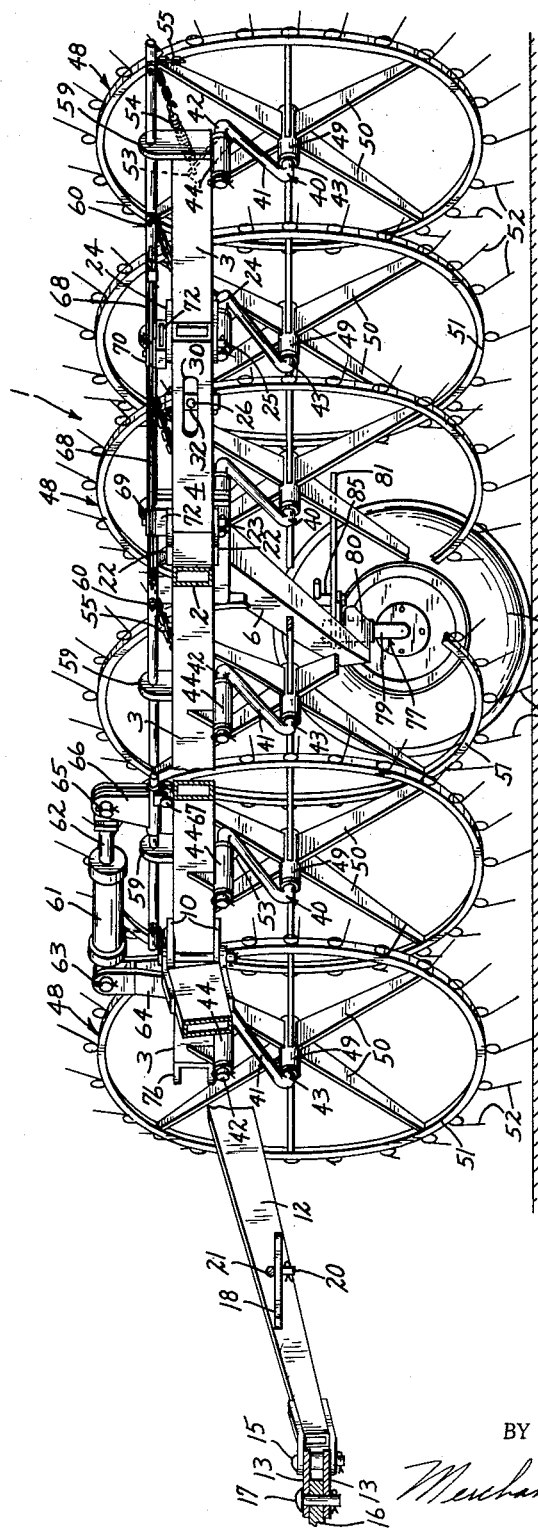
FIG. 2 is an enlarged view in longitudinal section taken on the irregular line 2—2 of FIG. 1, some parts being broken away.

With reference to FIGS. 1 and 8–10, it will be seen that the frame members 2 and 3, together with the raking wheels carried thereby, may be moved to various angularly displaced positions relative to each other, in accordance with various operating conditions. With the frame members 2 and 3 positioned as in FIG. 1, with the leg 4 disposed adjacent and substantially parallel to the frame member 3, the rearmost raking wheel 48 associated with the frame member 3 is disposed in over-lapping relationship to the rearmost raking wheel 48 associated with the frame member 2. With this arrangement, all of the cut crop, such as hay, engaged by the rake in a given passage through a field will be turned over by the raking wheels and formed in a windrow slightly to the left of the rearmost raking wheel 48 associated with the frame member 3, and with respect to FIG. 1. In other words, with the rake arranged as in FIG. 1, all of the hay in a swath thereof gathered by the rake will be tedded as well as formed into a windrow. It will be appreciated that the width of the swath raked by the wheel rake when the link 4 is disposed as shown in FIG. 1, may be varied according to the positioning of the tie rod 21 relative to the tongues 11 and 12. If the tie rod 21 is moved toward the hitch plates 13 and the down-turned ends 20 thereof inserted in the holes 19 at the forward ends of the flanges or brackets 18, the angle between the tongues 11 and 12 will be increased, as shown in FIG. 8, with a resultant angular movement of the frame members 2 and 3. On the other hand, placement of the tie rod 21 as shown in FIG. 9, will reduce the angle between the frame members 2 and 3 so that the rake operates over a considerably more narrow swath than otherwise.

Adjustment of the rear end portions of the frame members 2 and 3 relative to each other, caused by manipulating the crank 37 to vary the angular relationship between the frame member 3 and the link 4, not only changes the angular displacement between the frame members 2 and 3 independently of the tie rod 21, but also affects the width of the windrow formed by the rake as it travels over the field. As above stated, with the link 4 disposed as shown in FIG. 1, all of the crop such as hay, in the swath will be engaged by one or more of the raking wheels 48 and moved laterally and turned over thereby. As shown in FIG. 8 and 9, movement of the link 4 angularly away from closely spaced parallel relation to the frame member 3 increases the lateral spacing between the rearmost raking wheels 48 associated with the frame members 2 and 3, whereby a relatively wide windrow results, as indicated by the broken lines X—X in FIGS. 8 and 9. It will be noted that, with the rear ends of the frame members 2 and 3 spaced as in FIGS. 8 and 9, some of the hay centrally of the rake is not touched by the raking wheels 48, and the raked hay is deposited thereon. It will be further appreciated that positioning of the tie rod 21 may be accomplished independently of the positioning of the link 4, so that a wide or narrow swath may be raked to provide either a wide or narrow windrow as desired. In practice, it is usually desired to spread the front end portions of the frames 2 and 3 to rake a relatively wide swath when the hay crop is relatively sparse. On the other hand, when raking a field where the crop is relatively abundant and heavy, it is more desirable to rake a relatively narrow swath, disposing the tie rod 21 as shown in FIG. 9.

When it is desired to transport the rake over a laterally restricted area, such as on a highway, or through a gate, the frame members are disposed as shown in FIG. 10. The front ends of the frame members 2 and 3 are provided with apertured brackets 76 for reception of the down-turned end 20 of the tie rod 21. With this arrangement, the angular displacement between the tongues 11 and 12 and frame members 2 and 3 is held at a minimum as is the overall width of the rake.

In order that the wheels 7 and 8 may roll in a forward direction in all adjusted positions of the frame members 2 and 3 relative to each other, I provide adjustable connections between the wheels 7 and 8 and their respective legs 5 and 6. The wheels 7 and 8 are connected to their respective legs 5 and 6 by L-shaped spindles 77 having horizontally disposed axles 78 on which the wheels 7 and 8 are journalled, and generally vertically disposed portions 79 that are journalled in bearing brackets or the like 80 at the outer ends of the legs 5 and 6. At their upper ends, the vertically disposed portions 79 are provided with adjustment handles 81 by means of which the spindles 77 may be rotated on vertical axes. The handles 81 are provided with apertures 82 that are alignable with selected ones of a plurality of cooperating apertures 83 in locking plates or the like 84 welded or otherwise secured to the brackets 80 at the outer ends of the legs 5 and 6. Locking pins or the like 85 are insertable through selected ones of the apertures 82 and 83 to properly position and lock the wheels 7 and 8 for rotation in a forward direction and in accordance with the selected angular displacement between the frame members 2 and 3. Locking of the wheels 7 and 8 in their correct two positions of pivotal movement about the vertical axis of the spindle portions 79, effects lateral stability of the rake during its movement over the ground, and causes the same to track properly behind a tractor or other pulling means.

The above described rake has proved highly advantageous in its operation. By providing rearwardly converging echelons of raking wheels as described, lateral thrust of one of said echelons is at least partially offset by the lateral thrust of the other thereof in the opposite direction, so that the rake tracks easily. Further, by providing a center delivery rake as described, a relatively wide swath may be raked with a relatively compact structure; and, by arranging the echelons of raking wheels in rearwardly converging disposition, with the adjustments thereof hereinbefore described, a windrow of any desired width or structural character may be formed.

My wheel rake has been thoroughly tested and found to be completely satisfactory for the accomplishment of the objectives set forth; and, while I have shown and described a commercial embodiment of my center delivery rotary rake, it will be understood that the same is capable of modification without departure from the spirit and scope of the invention as defined in the claims.

What I claim is:
1. In a center delivery wheel rake,
  (a) a frame having means for attachment to a prime mover and comprising a pair of generally horizontally disposed elongated frame members having front and rear end portions and arranged in rearwardly converging relationship relative to the normal direction of travel of the prime mover,
  (b) a rigid link having one end pivotally connected to the rear end portion of one of said frame members on a generally vertical axis and having an opposite end pivotally connected to the rear end portion of the other of said frame members on a generally vertical axis whereby said frame members may be pivotally moved relative to said link and relative to each other to vary the angular relationship between said frame members and to vary the lateral spacing between said rear end portions of the frame members,
  (c) means for imparting pivotal movements to said link relative to one of said frame members to vary the angular relationship therebetween and for locking said link against said pivotal movement in desired positions of said pivotal movement,
  (d) a plurality of rotary raking means carried by one of said frame members and arranged in echelon in substantially parallel erect planes angularly displaced from the normal direction of movement of the frame, (e) a plurality of rotary raking means carried by the other of said frame members and arranged in echelon in substantially parallel erect planes angularly displaced from said normal direction of movement of the frame and converging rearwardly with said first-mentioned planes, (f) said means for attachment to a prime mover comprising a pair of forwardly converging draft arms each having front and rear ends and each pivotally connected at its rear end to the front end portion of a different one of said frame members on a generally vertical axis, a coupling element having a rear end pivotally connected to the front ends of said draft arms on generally vertical axes and having a front end for connection to the prime mover, and a transverse rigid tie having opposite ends one each for connection to a different one of said draft arms at selected ones of a plurality of longitudinally spaced points on said draft arms to releasably lock said frame members in different angularly displaced positions relative to each other, (g) said forwardly converging draft arms and coupling element being the sole draft connection between said frame and said prime mover.

2. The structure defined in claim 1 in which said rotary raking means comprise raking tine-equipped wheels carried by their respective frame members for individual floating movement in their respective planes by means including, (a) a plurality of crank elements one for each of said raking wheels, (b) each of said crank elements having inner and outer ends and having an axle at its outer end and having a pintle at its inner end generally parallel with said axle and angularly displaced relative to said crank element, (c) each of said raking wheels being journalled on a respective one of said axles, (d) said pintles being journalled on their respective frame members, (e) springs individual to said raking wheels and connected to said crank elements, a pair of lifting rods connected to said springs and longitudinally slidably mounted each on a different one of said frame members, (f) means on one of said frame members for imparting movement to the lifting rod associated therewith in a direction to increase the bias of the springs thereof to elevate said crank elements and their respective raking wheels of said one of the frame members, (g) and a flexible tie member connecting the adjacent ends of said lifting rods, (h) said flexible tie member being responsive to movement of one of said lifting rods in a crank elevating direction to impart similar crank elevating movement to the other of said lifting rods.

3. The structure defined in claim 2 in further combination with means on said link for supporting said flexible tie member in various relative positions of said frame members and said link.

4. The structure defined in claim 3 in which said flexible tie member comprises a flexible cable, and in which said last-mentioned means comprises cable supporting pulleys at opposite ends of said link for maintaining said cable in an operative relationship with both of said lifting rods in all relative positions of said frame members and said link.

References Cited in the file of this patent
UNITED STATES PATENTS

| | | |
|---|---|---|
| 2,602,280 | Crowe et al. | July 8, 1952 |
| 2,635,411 | Hicks | Apr. 21, 1953 |
| 2,683,345 | Meyer | July 13, 1954 |
| 2,893,192 | Tallman | July 7, 1959 |
| 3,015,202 | Van der Lely et al. | Jan. 2, 1962 |